(12) United States Patent
Omi

(10) Patent No.: US 6,661,141 B1
(45) Date of Patent: Dec. 9, 2003

(54) BLOWER

(75) Inventor: Kenji Omi, Kitasaku-gun (JP)

(73) Assignee: Minebea Co. Ltd., Nagano-Ken (JP)

( * ) Notice: Subject to any disclaimer, the term of this patent is extended or adjusted under 35 U.S.C. 154(b) by 0 days.

(21) Appl. No.: 09/583,729

(22) Filed: May 31, 2000

(30) Foreign Application Priority Data

Jun. 2, 1999 (JP) ............................. 11-155237

(51) Int. Cl.[7] ............................. H02K 7/08; F16C 33/60
(52) U.S. Cl. ........................ 310/90; 384/504; 384/518
(58) Field of Search ..................... 310/90, 504, 513, 310/517–518

(56) References Cited

U.S. PATENT DOCUMENTS

| | | | | |
|---|---|---|---|---|
| 4,867,581 A | * | 9/1989 | Schmidt et al. ............... | 310/42 |
| 5,128,571 A | * | 7/1992 | Itsu ............................... | 310/90 |
| 5,274,289 A | * | 12/1993 | Wrobel .......................... | 310/90 |
| 5,547,291 A | * | 8/1996 | Miyazaki et al. ............ | 384/512 |
| 5,698,919 A | * | 12/1997 | Obara ........................... | 310/90 |
| 6,010,247 A | * | 1/2000 | Mouri et al. ................. | 384/517 |
| 6,394,657 B1 | * | 5/2002 | Takamizawa et al. ....... | 384/512 |

* cited by examiner

Primary Examiner—Burton Mullins
(74) Attorney, Agent, or Firm—Oliff & Berridge, PLC

(57) ABSTRACT

In the blower 1 which fixes the impeller 17 on one end of the shaft 11, as bearing to support the shaft 11, in the resin-made bearing box 7b, two ball bearings 8, 9 the width of the inner races of which is smaller than the width of the outer races are inserted from one side of the box, and one inner race of the two ball bearings 8, 9 is pressurized toward the other ball bearing 9 with a spring 14. Two ball bearings 8, 9 are fixed at the position where the coaxiality becomes minimum. In addition, since the inner race is given with a pressurization by pushing of the spring 14, the position where the coaxiality becomes minimum can be kept.

2 Claims, 2 Drawing Sheets

BLOWER

BACKGROUND OF THE INVENTION

1. Field of the Invention

The present invention relates to an improvement of a blower for use in various kinds of office automation apparatus, in particular, an improvement on thin type blower.

2. The Related Art

In an apparatus like an office automation apparatus which accommodates various kinds of electronic parts within a casing, heat generated by such electronic parts remains inside the casing which may cause the electronic parts to be broken. Therefore, the side wall of the casing is provided with a vent, in which a blower is mounted to discharge the heat in the case outside. The blower thus used has often been provided with two ball bearings in order to prevent the vibrations in both axial and radial directions to make the blower rotate stably.

Recently, the office automation apparatus has been developed to make it miniaturized. As the miniaturization develops, the blower itself is requested to be miniaturized in size and thickness. When the miniaturization in size and thickness is realized, a high precision bearing has to be used, since the allowable vibration of the rotary shaft supported by the bearings becomes narrower.

When high precision bearings are used to prevent vibration of a rotary shaft, it is often practiced to juxtapose two bearings (ball bearings) in a cylindrical bearing box. When juxtaposing two bearings, the vibration becomes small since the supporting span becomes large. However, when the supporting span is made long as described, the coaxiality of the two bearings has to be kept at a small rate, since otherwise a tension from an undesirable direction will effect the rotary shaft. It has been found that in general, the coaxiality of the two bearings to be used in a blower for office automation apparatus has to be kept at 0.01 mm or less.

As a result, the coaxiality between the two bearings will be kept at a rate of 0.01 mm or less, however achieving this precision while inserting two bearings into a resin-made bearing box requires a high level of technique and is not feasible easily.

The present invention has been made in the light of this problem, and with a comparatively easy structure it is intended to provide a blower, in which its coaxiality of used bearings is made to be kept at 0.01 mm or less.

The present invention has been made to solve the above problem and according to a first aspect of the present invention, an impeller is fixed on one end of a shaft rotatably supported by bearings, where a ring-like magnet is provided inside the said impeller; characterized that on a blower causing said impeller and said shaft to rotate by the effect of a magnetic interference with the aforementioned magnet by supplying a current on a winding provided at a location relative to the said magnet of the stator, 2 ball bearings on which the width of the inner ring is smaller than the width of the outer ring, inserted into a bearing housing from one side, are used as aforementioned bearings.

Further, according to a second aspect of the present invention, an impeller is fixed on the end of a shaft rotatably supported by bearings, where a ring-like magnet is provided inside the said impeller; characterized that on a blower causing said impeller and said shaft to rotate by the magnet by supplying a current on a winding provided at a location relative to the said magnet of the stator, that 2 bearings, on which inner ring width is larger than the outer ring width are inserted into a bearing housing from one side, one of the inner race of the 2 bearings is pushed towards the outer bearing by a spring, are used as aforementioned bearings.

By the construction of the first aspect, since the width dimension of the inner race inserted in the resin-made bearing box from one side thereof is smaller than the width of the outer race, if the outer race is contacted, the inner race is not, the two bearings become possible to be turned within a minute area at the contacting point as the turning center. Due to this turning, since the outer race and inner race can be displaced to the shaft, those are fixed at a position where the coaxiality is minimum.

Further, if constituted according to the second aspect, since one inner race of the two bearings is pushed toward the other bearing by a spring and a pressurization is given, it becomes possible to maintain the position where the coaxiality becomes minimum.

EMBODIMENT

Figure 1:
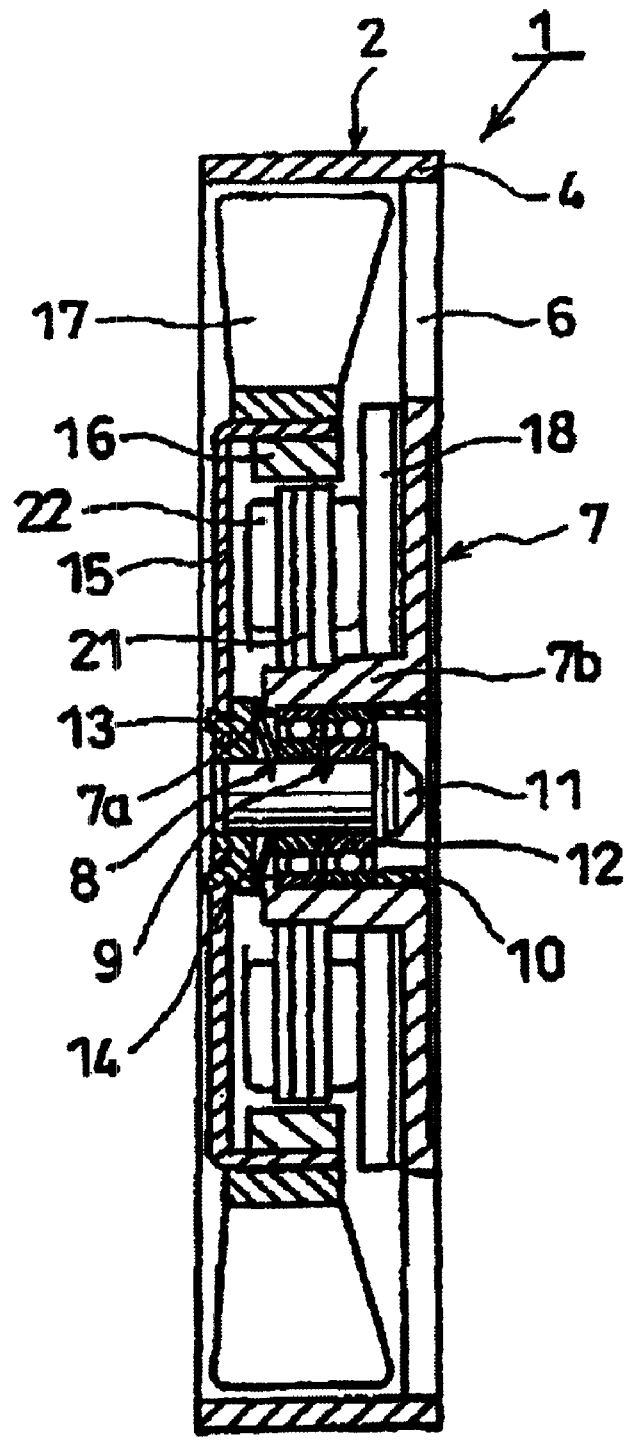
FIG. 1 is a vertically sectional view of the embodiment of the blower of the present invention.
Figure 2:
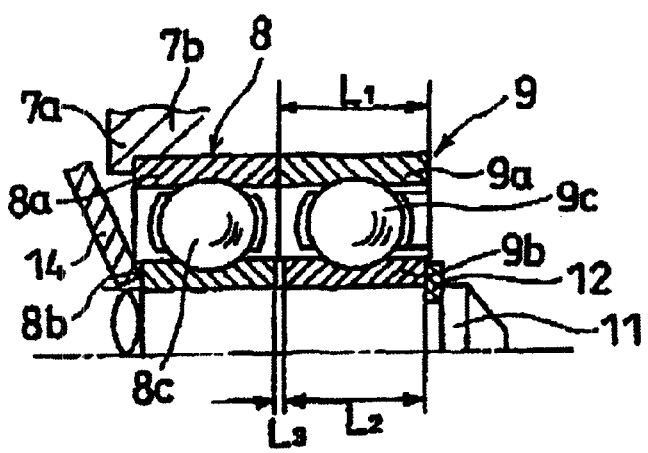
FIG. 2 is an enlarged sectional view of the two ball bearings.
Figure 3:
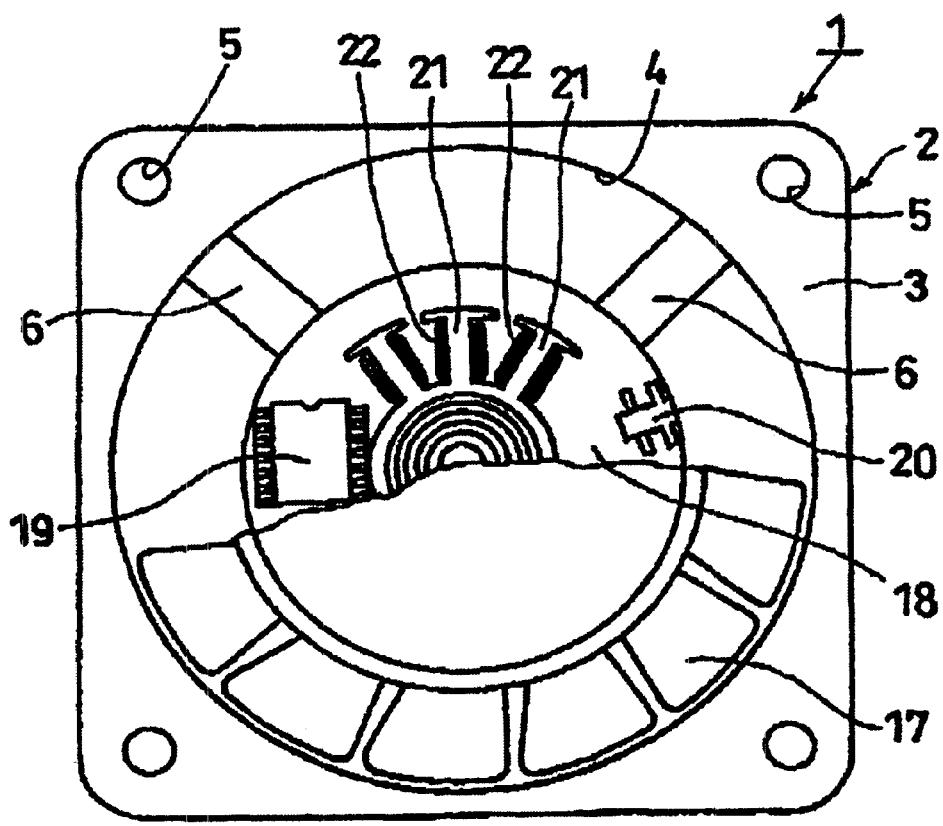
FIG. 3 is a front view partially cut away viewing in the right direction of FIG. 1.

Hereinafter, an embodiment of the present invention is explained based on attached drawings. FIG. 1 is a vertically sectional view of the whole of a blower 1. FIG. 2 is an enlarged view of the shaft and bearings of FIG. 1, and FIG. 3 is a front view partially cut away seeing in the right direction of FIG. 1.

A casing 2 is a flange 3 approximately square in front view and made of a resin with a cylindrical portion 4 in a unitary manner and adapted to be mounted at necessary portions with bolts through holes 5 provided on the flange 3. On the casing 2, a motor base 7 supported by four spokes 6 is provided in a unitary manner.

At the center portion of the motor base 7, as shown in FIG. 1, a cylindrical bearing box 7b, the tip of which is oriented inside and having a bottom portion 7a, is formed, and two ball bearings 8, 9 are inserted into the bearing box 7b from the right side of FIG. 1 and abutted to the bottom 7a to hold the outer races 8a and 9a (see FIG. 2). At an outer end of the outer race of the ball bearing 9, a spacer 10 for preventing removal is provided. As to details of the ball bearing, these are explained later. At the center of the motor base 7, a shaft 11 (rotary shaft) passes through and is rotatably supported with the inner races 8b and 9b of the ball bearings 8 and 9.

At one end of the shaft 11, a retainer ring 12 is coupled and abuts to the inner race 9b of the ball bearing 9. And at the other end of the shaft 11, a bush 13 is coupled, and between the bush 13 and the inner race 8a of the ball bearing 8, a spring 14 (belleville spring) is interposed and gives a pressurization to the inner race 8b of the ball bearing 8 in the right direction in FIG. 1.

At the portion where the bush 13 of the shaft 11 is coupled, the center portion of the plate-like yoke 15 is mounted by pressing and sticking, and on the inner peripheral portion a ring-like magnet 16 is mounted on by adhering.

Further, on the outer periphery of the yoke 15 an impeller (blades) 17 is mounted. The periphery of the impeller opposes to the cylindrical portion 4 of the casing 2. On the rear portion of the motor base 7, a PC (printed circuit) Board 18 is mounted where parts 19, 20 are mounted which serve as control circuit of the blower 1. And, on the rear surface of the PC board 18, a stator core 21 mounted on the bearing box 7b of the motor base 7 is positioned, and its periphery opposes to the magnet 16. On the stator core 21 a stator winding 22 is wound, and connected to the PC board 18.

Thus structured blower 1, when the stator core 21 is magnetized by being supplied with power through the electronic parts 19, 20 as a controlling circuit to the stator winding 22, due to the mutual magnetic function with the magnet 16, the shaft 11 is rotated with the magnet 16 and the yoke 15. Since the impeller 17 is mounted on the periphery of the yoke 15, it rotates in a unitary manner and between the casing 2 and the cylindrical portion 4.

Based on FIG. 2 ball bearings 8, 9 are explained. Although the ball bearings 8, 9 are formed in such a manner that balls 8c, 9c are interposed between outer races 8a, 9a and inner races 8b, 9b through the retainers 8d, 9d, different from ordinary ball bearings, the width dimension $L_2$ of the inner races 8b, 9b is smaller than the width dimension $L_1$ of the outer races 8a, 9a. Due to the difference of the width dimension described above, between the inner race 8b of the ball bearing 8 and the inner race 9b of the ball bearing 9, clearance $L_3$ ($L_3=L_1-L_2$) can be obtained. With this clearance $L_3$ (e.g., 0.1~0.3 mm), while contacting the shaft 11, the two ball bearings 8, 9 can be displaced while accommodating their positions with respect to the direction of the shaft 11, so that the coaxiality of the ball bearings is increased.

And, at the other end of the shaft 11, the bush 13 is coupled, and since, between the bush 13 and the inner race 8a of the ball bearing 8, the spring 14 is interposed and gives a pressurization to the inner race 8b of the ball bearing 8, the coaxiality of the ball bearings is kept by pressurizing the inner race 8b of the ball bearing 8 to the side of inner race 9b of the ball bearing 9.

As described above, the present invention relates to the blower wherein as a bearing, in the resin-made bearing box, two ball bearings the width dimension of an inner race of which is smaller than the width dimension of an outer race are inserted from one side, and to a shaft the two ball bearings are fixed at a position where the coaxiality is minimum. Moreover, by giving a pressurization to one inner race of the two ball bearings toward the other ball bearing with a spring, the coaxiality of the ball bearings can be kept at a minimum.

What is claimed is:

1. In a blower which comprises an impeller fixed on one end of a shaft supported rotatably by bearings and a ring-like mnagnet provided inside the impeller, wherein the shaft and the impeller rotate due to a magnetic interference function between the magnet and a winding provided at a position of a stator corresponding to the magnet, which is supplied with a current, the blower is characterized in that, in a resin-miade bearing box, two ball bearings each having an inner race and an outer race, the inner race being narrower than the outer race, are inserted from one side of the blower, a retainer ring is provided on one end of the shaft, another end of the shaft is secured to a bush fixed to center portion of a yoke, the retainer ring contacts the inner race of one ball bearing, a spring interposed between the bush and the inner race of the other ball bearing, wherein the inner race of each of the ball bearings is mounted to the shaft so that coaxiality and position of the ball bearings are maintained in order by adjusting the position of each of the inner races through a displacement created between the outer surface of the shaft and the outer surface of the inner race abutting the outer surface of the shaft, the displacement created in relation to a gap which is formed between a side face of the inner races after the bearings are inserted in the bearing box in such a manner that a side face of the outer race of each of the bearings abut each other, wherein one of the inner races of the two ball bearings is pushed with the spring toward the other ball bearing by applying pre-load.

2. A blower, comprising:

a shaft defining one end, another end and an outer surface;

bearings;

an impeller fixed on the one end of the shaft and supported rotatably by the bearings;

a ring-like magnet provided inside of the impeller;

a stator;

a winding, the shaft and the impeller being rotatable due to a magnetic interference function between the ring-like magnet and the winding which is provided at a position of the stator corresponding to the ring-like magnet and which is supplied with a current;

a resin bearing box;

two ball bearings disposed in the resin bearing box, the two ball bearings each having an inner race and an outer race, the inner race being narrower than the outer race, the two ball bearings being insertable from one side of the blower;

a retainer ring provided at the one end of the shaft, the retainer ring contacting the inner race of one ball bearing of the two ball bearings;

a bush, the other end of the shaft being secured to the bush;

a yoke, defining a center portion, and fixed to the bush; and a spring interposed between the bush and the inner race of the other ball bearing of the two ball bearings;

wherein the inner race of each of the ball bearings is mounted to the shaft so that coaxiality and position of the ball bearings are maintained by adjusting a position of each of the inner races through a displacement created between the outer surface of the shaft and the outer surface of the inner race abutting the outer surface of the shaft, the displacement created in relation to a gap which is formed between a side face of the inner races after the bearings are inserted in the bearing box in such a manner that a side face of the outer race of each of the bearings abut each other; and wherein one of the inner races of the two ball bearings is pushed with the spring toward the other ball bearing by applying pre-load.

* * * * *